United States Patent
Gold et al.

(10) Patent No.: US 6,304,659 B1
(45) Date of Patent: Oct. 16, 2001

(54) SECURE DATA BROADCASTING

(75) Inventors: Martin Gold, Stockbridge; Paul Austin Merry, Southampton; Nigel Stephen Dallard, Eastleigh; Anthony Mountifield, Winchester, all of (GB)

(73) Assignee: Tandberg Television ASA, N-Lysaker (NO)

( * ) Notice: Subject to any disclaimer, the term of this patent is extended or adjusted under 35 U.S.C. 154(b) by 0 days.

(21) Appl. No.: 09/142,188

(22) PCT Filed: Mar. 13, 1997

(86) PCT No.: PCT/GB97/00697

§ 371 Date: Sep. 2, 1998

§ 102(e) Date: Sep. 2, 1998

(87) PCT Pub. No.: WO97/35431

PCT Pub. Date: Sep. 25, 1997

(30) Foreign Application Priority Data

Mar. 15, 1996 (GB) .................................................. 9605472

(51) Int. Cl.[7] .................................................... H04L 9/00
(52) U.S. Cl. ....................... 380/239; 380/240; 380/216; 380/200; 713/162
(58) Field of Search ........................... 713/162; 380/239, 380/240, 216, 200

(56) References Cited

U.S. PATENT DOCUMENTS

| 4,991,207 | 2/1991 | Shiraishi et al. | 380/9 |
|---|---|---|---|
| 5,237,610 | * 8/1993 | Gammie et al. | 380/10 |
| 5,539,823 | * 7/1996 | Martin | 380/20 |
| 5,627,892 | * 5/1997 | Kauffman | 380/21 |

FOREIGN PATENT DOCUMENTS

| 0 679 029 A1 | 10/1995 | (EP) | H04N/7/16 |
|---|---|---|---|
| WO 94/10802 | 5/1994 | (WO) . | |

\* cited by examiner

*Primary Examiner*—Thomas R. Peeso
*Assistant Examiner*—Todd Jack
(74) *Attorney, Agent, or Firm*—Ladas & Parry

(57) ABSTRACT

In a method of receiving packets of data addressed to one or more receivers each having an individual identifier, wherein the data is included in a digital signal having destination addresses successively encrypted from a sequence of control words and receiver identifiers, and control messages containing the control words in encrypted form, address flags and control flags. The method processes the control messages to construct receiver addresses from the control words and the receiver identifier; directs the receiver addresses to update a receiver address register selected by the associated control flag in response to the transmitted control flags; directs each destination address to be compared with the receiver address to one of the address registers selected by the associated address flag in response to the address flags and; accepts each packet of data having a destination address matching the receiver address to which it was compared.

20 Claims, 3 Drawing Sheets

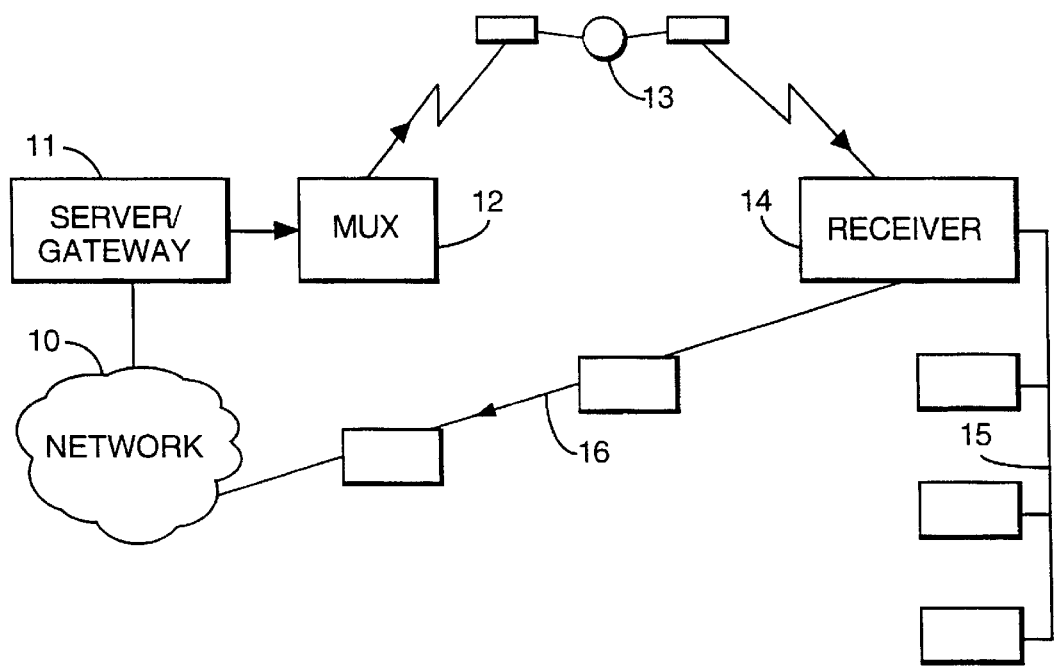

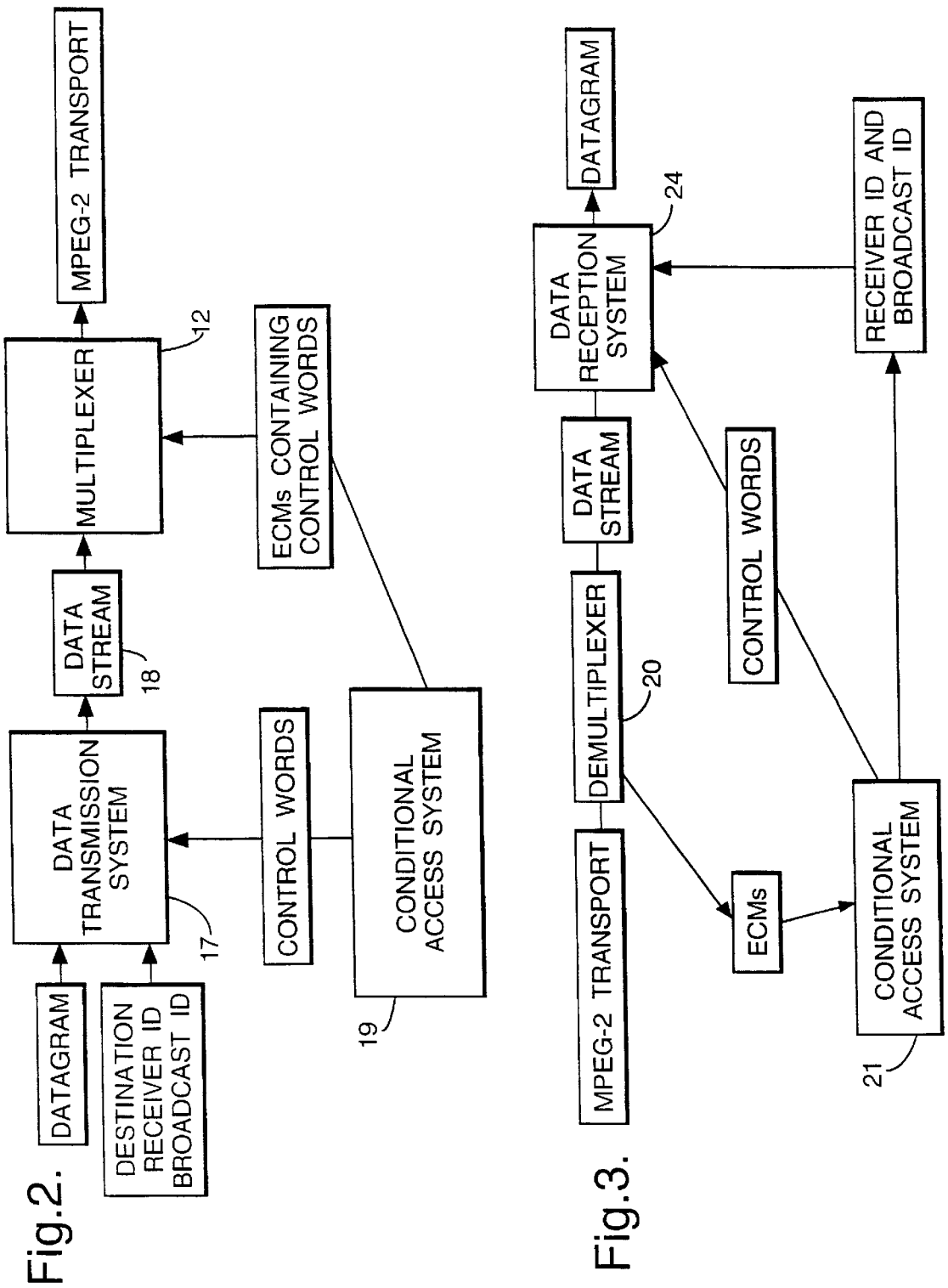

SECURE DATA BROADCASTING

Figure 4:
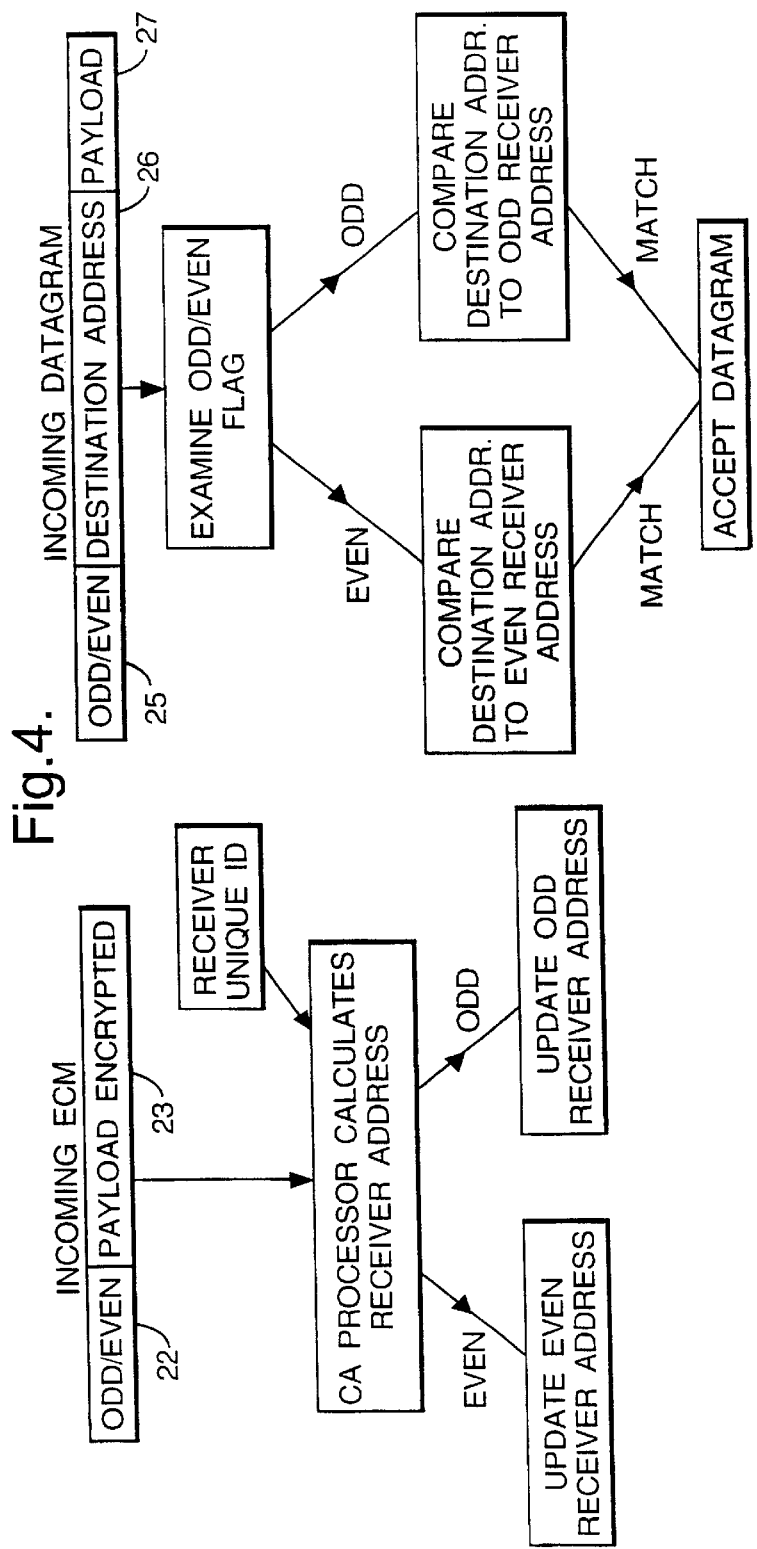

The present invention relates to a method and apparatus for including data within a digital television signal while providing protection against analysis of the destination of the data to the intended recipients.

A digital video broadcast (DVB) channel may be used to transmit datagrams to individual receivers, groups of receivers (multicast) or all receivers (broadcast) which have access to the broadcast channel within a Digital Video Broadcast/Motion Picture Expert Group 2 (DVB/MPEG-2) Transport Stream. Datagrams are prefixed with a header that contains a protocol-independent destination address within the data broadcasting network and a protocol identifier. If the destination addresses are clear (i.e. not encrypted) it is possible for the traffic of data being transmitted to receivers accessing the channel to be monitored and commercial information relating to this traffic may consequently be exposed.

European Patent No 0 679 029 proposes a method of increasing the security of data being transmitted to receivers by use of encryption keys. These keys, used by a transmitter to encode data, are transmitted to a receiver in encrypted form using either single or double encryption techniques. These keys are then decrypted at the receiver before being used to decrypt the transmitted data. However, in the method described the encrypted keys and the data are sent in data packets in which the address is in unencrypted form.

International Patent No WO 94/10802 describes a method of sending addressable data to a receiver having a unique identification number. The addressable data may contain various subscriber specific data such as, for example, program authorisation information. Again, the addresses used to identify the specific receivers in the transmitted data packet are not encrypted, allowing traffic analysis to be performed on the transmitted data packets which could result in such commercial information becoming exposed.

The present invention is concerned with a method and apparatus for protecting the destination addresses of data being transmitted over a digital video broadcasting channel.

According to one aspect of the invention, there is provided a method of receiving data addressed to one or more receivers each having an individual identifier wherein the data is included in a digital signal comprising destination addresses successively encrypted from a sequence of control words, and control messages containing the control words in encrypted form, address flags and control flags, the method comprising:

processing the control messages to construct receiver addresses from the control words and the receiver identifier;

directing the receiver addresses to update a receiver address register selected by the associated control flag in response to the transmitted control flags;

directing each destination address to be compared with the receiver address to one of the address registers selected by the associated address flag in response to the address flags and;

accepting each packet of data having a destination address matching the receiver address to which it was compared.

According to a second aspect of the present invention, there is provided apparatus for receiving data addressed to one or more receivers each having an individual identifier wherein the data is included in a digital signal comprising destination addresses successively encrypted from a sequence of control words, and control messages containing the control words in encrypted form, address flags and control flags, the method comprising:

processing means for processing the control messages to construct receiver addresses from the control words and the receiver identifier;

a first directing means for directing the receiver addresses to update a receiver address register selected by the associated control flag in response to the transmitted control flags;

a second directing means for directing each destination address to be compared with the receiver address to one of the address registers selected by the associated address flag in response to the address flags and;

accepting means for accepting each packet of data having a destination address matching the receiver address to which it was compared.

According to a third aspect of the invention, there is provided a method of creating a secure data-stream containing one or more data packets to be transmitted to one or more receivers each having an individual identifier, the method comprising the steps of;

allocating control messages comprising control flags and control words in encrypted form and multiplexing these with the data-stream;

encrypting the destination address in the header of the or each data packet using the receiver identifier and the control word as inputs;

allocating an address flag for inclusion within the or each data packet for use by a receiver in accepting or rejecting such a data packet.

Figure 5:
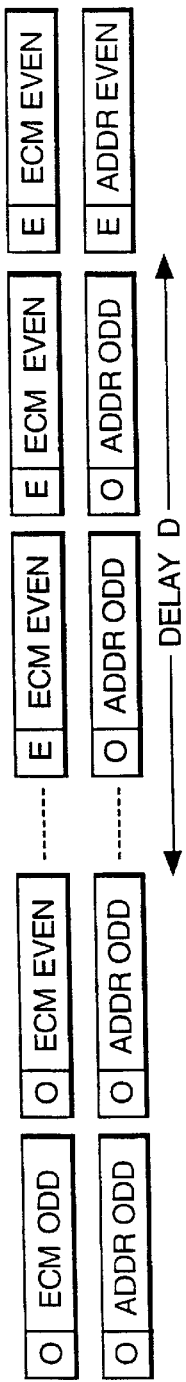

The invention will now be described, by way of example with reference to the accompanying drawings in which:

FIG. 1 shows an overview of the architecture of a system according to the invention, FIG. 2 shows a transmission system included in the architecture of FIG. 1, FIG. 3 shows a reception system included in the architecture of FIG. 1, FIG. 4 shows the sequence of generating receiver addresses and comparing the generated receiver addresses with incoming destination addresses in the system of FIG. 3 and, FIG. 5 is a timing diagram of elements in a digital broadcast signal used in the system of the preceding Figures.

Referring to FIG. 1, there is shown a system architecture for a system including a network generally designated 10 connected to a server/gateway 11 which supplies digital video broadcast signals to a multiplexer 12. The signals are broadcast via a satellite link 13 to a number of subscribing receivers of which one is shown at 14. The receiver has an individual identifier distinguishing the receiver. The system may be used to address transmissions to individual receivers, to groups of receivers (multicast) or to all receivers (broadcast). The receiver 14 is shown connected in a Local Area Network (LAN) 15. A return path from the receiver 14 to the network 10 is shown at 16.

Turning now to FIG. 2, there is shown the transmission system included in the architecture of FIG. 1. A data transmission system 17 receives datagrams from a protocol stack for transmission. The datagrams consist of packets of data prefixed with a header containing a protocol independent destination address and a protocol identifier. The datagrams are inserted into a DVB/MPEG-2 data-stream as shown at 18 for supply to the multiplexer 12.

A conditional access system 19 supplies control words to the data transmission system and the actual destination address in the header of each datagram is generated using a cryptographic function with the receiver identifier and a control word as inputs. The control word supplied by the conditional access system 19 is changed frequently so that a sequence of control words arrive at the data transmission system 17. As a result, many different destination addresses are used to identify an individual receiver, and many different receivers potentially use the same destination address at different times. The cryptographic function is chosen such that the control word cannot be used to convert a destination address back into a receiver identifier. It thus becomes very difficult to perform any kind of traffic analysis on the transport stream transmitted by the system.

Data packets to be broadcast to all receivers are handled by allocating a non specific receiver identifier such as OxFFFFFFFF. The same cryptographic function is applied to this identifier, using the current control word and yielding the destination address for broadcast packets. Multicasts may be handled by allocating a further range of identifiers, such as OxFF000000 to OxFFFFFFFE. To secure the contents of a datagram, it may be encrypted using another cryptographic function based on the receiver identifier, or a unique key associated with the receiver or a further control word.

The conditional access system 19 also supplies entitlement control messages including the control words in encrypted form to the multiplexer 12 to be multiplexed with the data-stream 18. As will be explained later, each datagram includes an address flag which is used in the receiver to control the processing operations of the receiver. Additionally each entitlement control message includes a control flag to control the processing operations of the receiver.

In FIG. 3, the digital video broadcast signal is received at a demultiplexer 20 where the entitlement control messages containing the encrypted control words are directed to a conditional access system 21. In the conditional access system 21 the entitlement control messages are processed to construct receiver addresses by calculation from the control words with the receiver identifier which is individual to the receiver.

As shown in FIG. 4, each incoming entitlement control message has a structure to include a control flag 22 and the encrypted control word 23 constituting the payload of the message. The control flag may be either an odd or an even control flag and the conditional access control system 21 will direct the receiver addresses that are constructed into either one of two paths according to the significance of the control flag. The control words and the receiver addresses are passed to the data reception system 24 where the receiver addresses are used to update an odd address register if the associated control flag was odd and an even address register if the associated control flag is even.

The data reception system 24 receives the datagrams in the data-stream from the demultiplexer 20 including the address flag associated with each datagram. As shown in FIG. 4, each incoming datagram has an address flag, the encrypted destination address and the payload of data 27. The address flag represents either an odd or an even datagram destination address which determines how the destination address is processed. After decryption using the control words supplied by the conditional access system 21, the datagrams are passed for comparison with either the dynamic receiver address in the odd address register or the dynamic address registered in the even register. The choice of comparison depends on whether the address flag for the datagram being processed is odd or even.

If a match is found between the destination address for a datagram and the receiver address with which it is compared, the datagram is accepted by the data reception system. There is a delay in the operation of the conditional access system in processing each entitlement control message and the resulting provision of a receiver address to the appropriate odd or even register. For this reason, the timing of the control flags 22 has to be advanced relative to the timing of the address flags 25 as shown in FIG. 5. In FIG. 5, the odd control flags 22 and the odd address flags 25 are labelled O and the corresponding even flags are labelled E.

It will be apparent that the method and system described herein provides for a plurality of dynamic addresses for each receiver. In the specific example described, each receiver has two dynamic addresses of which one is in use at any one time while the other is being updated by way of the conditional access system.

What is claimed is:

1. A method of receiving packets of data addressed to one or more receivers each having an individual identifier wherein the data is included in a digital signal comprising destination addresses successively encrypted from a sequence of control words and receiver identifiers, and control messages containing the control words in encrypted form, address flags and control flags, the method comprising:

processing the control messages to construct receiver addresses from the control words and the receiver identifier;

directing the receiver addresses to update a receiver address register selected by the associated control flag in response to the transmitted control flags;

directing each destination address to be compared with the receiver address to one of the address registers selected by the associated address flag in response to the address flags and;

accepting each packet of data having a destination address matching the receiver address to which it was compared.

2. The method of claim 1, further comprising directing the receiver addresses, in response to the control flags, alternately to two receiver address registers.

3. The method of claim 1, further comprising directing each destination address, in response to the address flags, to be compared alternately with the receiver addresses in the two address registers.

4. The method of claim 1, further comprising advancing the timing of the control flags relative to the timing of the address flags.

5. The method of claim 1, wherein the method of encryption employed uses calculation.

6. The method of claim 1, further comprising using two address flags, one odd and one even, to divert data to either an odd or even destination address.

7. Apparatus for receiving packets of data addressed to one or more receivers each having an individual identifier wherein the data is included in a digital signal comprising destination addresses successively encrypted from a sequence of control words and receiver identifiers, and control messages containing the control words in encrypted form, address flags and control flags, the apparatus comprising:

processing means for processing the control messages to construct receiver addresses from the control words and the receiver identifier;

a first directing means for directing the receiver addresses to update a receiver address register selected by the associated control flag in response to the transmitted control flags;

a second directing means for directing each destination address to be compared with the receiver address to one of the address registers selected by the associated address flag in response to the address flags and;

accepting means for accepting each packet of data having a destination address matching the receiver address to which it was compared.

8. The apparatus of claim 7, wherein the first directing means directs the receiver addresses alternately to two receiver address registers.

9. The apparatus of claim 7, wherein the second directing means directs each destination address to be compared alternately with the receiver addresses in the two address registers.

10. The apparatus of claim 7, further comprising advancing means to advance the timing of the control flags relative to the timing of the address flags.

11. The apparatus of claim 7, further comprising encryption means encrypting by calculation.

12. A method of creating a secure data-stream containing datagrams to be transmitted to one or more receivers each having an individual identifier, the method comprising the steps of;
   allocating control messages comprising control flags and control words in encrypted form and multiplexing these with the data-stream;
   encrypting the destination address in the header of the or each data packet using the receiver identifier and the control word as inputs;
   allocating an address flag for inclusion within the or each data packet for use by a receiver in accepting or rejecting such a data packet.

13. The method of claim 12, further comprising changing the control word frequently.

14. The method of claim 12, wherein the cryptography function employed is such that the control word cannot be used to convert a destination address back into a receiver identifier.

15. The method of claim 12, further comprising encrypting the contents of the or each data packet using a separate cryptographic function.

16. The method of claim 12, further comprising transmitting the data within a Digital Video Broadcasting/Motion Picture Expert Group 2 (DVB/MPEG-2) Transport Stream.

17. A method of receiving packets of data addressed to one or more receivers each having an individual identifier wherein the data is included in a digital signal comprising destination addresses successively encrypted from a sequence of control words and receiver identifiers, and control messages containing the control words in encrypted form, address flags and control flags, the method comprising:
   processing the control messages to construct receiver addresses from the control words and the receiver identifier;
   directing the receiver addresses to update a receiver address register selected by the associated control flag in response to the transmitted control flags;
   directing each destination address to be compared with the receiver address to one of the address registers selected by the associated address flag in response to the address flags;
   accepting each packet of data having a destination address matching the receiver address to which it was compared; and
   further comprising the step of advancing the timing of the control flags relative to the timing of the address flags.

18. A method of receiving packets of data addressed to one or more receivers each having an individual identifier wherein the data is included in a digital signal comprising destination addresses successively encrypted from a sequence of control words and receiver identifiers, and control messages containing the control words in encrypted form, address flags and control flags, the method comprising:
   processing the control messages to construct receiver addresses from the control words and the receiver identifier;
   directing the receiver addresses to update a receiver address register selected by the associated control flag in response to the transmitted control flags;
   directing each destination address to be compared with the receiver address to one of the address registers selected by the associated address flag in response to the address flags;
   accepting each packet of data having a destination address matching the receiver address to which it was compared; and
   further comprising advancing the timing of the control flags relative to the timing of the address flags; and
   using two address flags, one odd and one even, to divert data to either an odd or an even destination address.

19. Apparatus for receiving packets of data addressed to one or more receivers each having an individual identifier wherein the data is included in a digital signal comprising destination addresses successively encrypted from a sequence of control words and receiver identifiers, and control messages containing the control words in encrypted form, address flags and control flags, the apparatus comprising:
   processing means for processing the control messages to construct receiver addresses from the control words and the receiver identifier;
   a first directing means for directing the receiver addresses to update a receiver address register selected by the associated control flag in response to the transmitted control flags;
   a second directing means for directing each destination address to be compared with the receiver address to one of the address registers selected by the associated address flag in response to the address flags;
   accepting means for accepting each packet of data having a destination address matching the receiver address to which it was compared; and
   further comprising advancing means to advance the timing of the control flags relative to the timing of the address flags.

20. Apparatus for receiving packets of data addressed to one or more receivers each having an individual identifier wherein the data is included in a digital signal comprising destination addresses successively encrypted from a sequence of control words and receiver identifiers, and control messages containing the control words in encrypted form, address flags and control flags, the apparatus comprising:
   processing means for processing the control messages to construct receiver addresses from the control words and the receiver identifier;
   a first directing means for directing the receiver addresses to update a receiver address register selected by the associated control flag in response to the transmitted control flags;
   a second directing means for directing each destination address to be compared with the receiver address to one of the address registers selected by the associated address flag in response to the address flags;
   accepting means for accepting each packet of data having a destination address matching the receiver address to which it was compared; and
   further comprising two address flags, one odd and one even adapted to divert to either an odd or even destination address.

* * * * *